United States Patent
Schmidt

(10) Patent No.: US 9,660,363 B2
(45) Date of Patent: May 23, 2017

(54) BATTERY TERMINAL

(71) Applicant: BREMI FAHRZEUG-ELEKTRIK GMBH+CO.KG, Dömitz (DE)

(72) Inventor: Herbert Schmidt, Meinerzhagen (DE)

(73) Assignee: BREMI FAHRZEUG-ELEKTRIK GMBH + CO. KG (DE)

( * ) Notice: Subject to any disclaimer, the term of this patent is extended or adjusted under 35 U.S.C. 154(b) by 0 days.

(21) Appl. No.: 15/027,555

(22) PCT Filed: Oct. 10, 2014

(86) PCT No.: PCT/EP2014/071741
§ 371 (c)(1),
(2) Date: Apr. 6, 2016

(87) PCT Pub. No.: WO2015/055525
PCT Pub. Date: Apr. 23, 2015

(65) Prior Publication Data
US 2016/0240942 A1    Aug. 18, 2016

(30) Foreign Application Priority Data

Oct. 14, 2013    (DE) .................... 20 2013 104 621 U

(51) Int. Cl.
*H01R 11/26* (2006.01)
*H01R 11/28* (2006.01)
*H01M 2/30* (2006.01)

(52) U.S. Cl.
CPC .............. *H01R 11/26* (2013.01); *H01M 2/30* (2013.01); *H01R 11/281* (2013.01);
(Continued)

(58) Field of Classification Search
CPC ..... H01M 2/30; H01M 2220/20; H01R 11/26; H01R 11/282; H01R 11/283;
(Continued)

(56) References Cited

U.S. PATENT DOCUMENTS 3,505,636 A    4/1970    McDowell
5,183,419 A *  2/1993    Dewar ................ H01R 11/286
                                                        439/388
(Continued)

FOREIGN PATENT DOCUMENTS

DE           19734809 A1    3/1999
DE       202005006400 U1    8/2006
(Continued)

OTHER PUBLICATIONS

International Search Report (in English and German) and Written Opinion (in German) of the International Searching Authority for PCT/EP2014/071741; ISA/EP.
(Continued)

*Primary Examiner* — Tulsidas C Patel
*Assistant Examiner* — Travis Chambers
(74) *Attorney, Agent, or Firm* — Harness, Dickey & Pierce, P.L.C.

(57) ABSTRACT

What is described is a battery terminal having a pole contact element which is designed to surround a pole of a rechargeable battery on a mounting plane; a first limb and a second limb which are each connected to the pole contact element, the spacing between the first and second limbs being reducible by application of force in order to fasten the pole contact element to the pole, and a tensioning arrangement which couples the two limbs to one another, said tensioning arrangement having a tensioning screw which can be actuated so as to apply force to the two limbs and which is oriented along a tensioning direction which is tilted with respect to the mounting plane. In this case, the tensioning arrangement comprises a first clamping piece which can be positioned on the first limb and a second clamping piece which can be positioned on the second limb, wherein the tensioning screw is passed through a first screw receptacle
(Continued)

Figure 1:
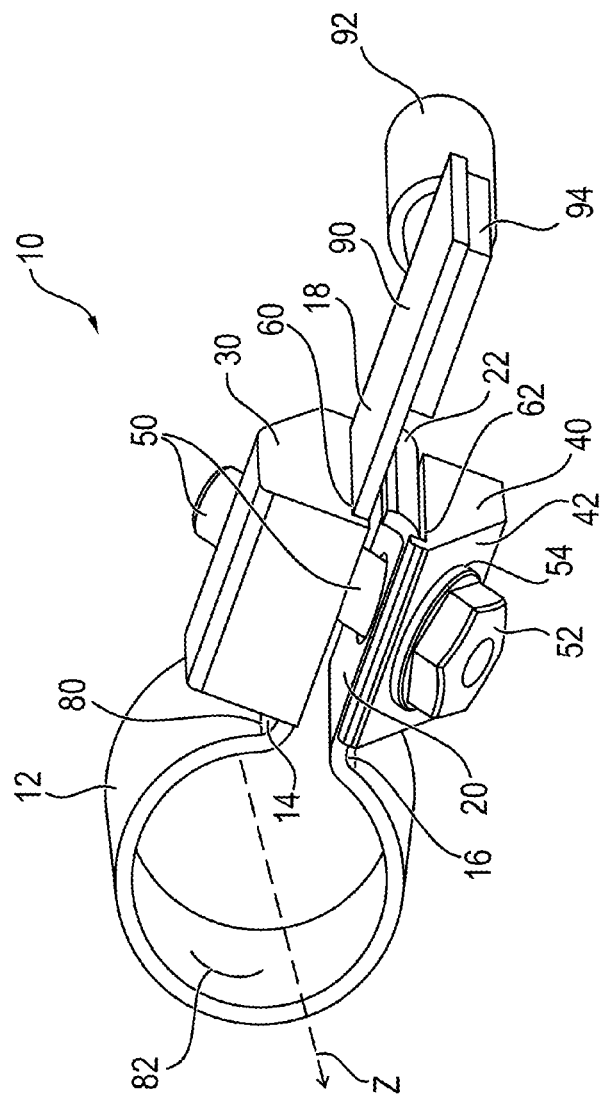

formed in the first clamping piece and a second screw receptacle formed in the second clamping piece, said first and second screw receptacles being aligned with one another along the tensioning direction.

12 Claims, 2 Drawing Sheets

(52) U.S. Cl.
CPC ....... *H01R 11/283* (2013.01); *H01M 2220/20* (2013.01); *H01R 11/282* (2013.01)

(58) Field of Classification Search
CPC ... H01R 11/285; H01R 11/286; H01R 11/287; H01R 11/281
USPC ........ 439/762, 754, 756, 758, 761, 765, 767
See application file for complete search history.

(56) References Cited

U.S. PATENT DOCUMENTS

| | | | | |
|---|---|---|---|---|
| 5,445,907 A | * | 8/1995 | Ito | H01R 11/283 |
| | | | | 429/178 |
| 5,492,780 A | * | 2/1996 | Okada | H01R 11/283 |
| | | | | 429/121 |
| 5,733,152 A | * | 3/1998 | Freitag | H01R 11/281 |
| | | | | 439/762 |
| 5,851,129 A | * | 12/1998 | Matsunaga | H01R 11/282 |
| | | | | 439/762 |
| 5,893,781 A | * | 4/1999 | Matsunaga | H01R 11/284 |
| | | | | 439/762 |
| 5,941,738 A | * | 8/1999 | Matsunaga | H01R 11/281 |
| | | | | 439/762 |
| 6,340,319 B1 | * | 1/2002 | Matsunaga | H01R 11/281 |
| | | | | 439/761 |
| 6,517,390 B2 | * | 2/2003 | Kim | H01R 11/287 |
| | | | | 439/754 |
| 7,166,001 B2 | * | 1/2007 | Detter | H01R 11/283 |
| | | | | 439/762 |
| 9,022,815 B2 | * | 5/2015 | Kim | H01R 11/281 |
| | | | | 439/762 |
| 9,263,810 B2 | * | 2/2016 | Noh | H01R 11/283 |
| 2004/0087219 A1 | | 5/2004 | Freitag | |
| 2011/0195615 A1 | | 8/2011 | Falchetti et al. | |
| 2012/0196492 A1 | * | 8/2012 | Facco | H01R 11/283 |
| | | | | 439/765 |
| 2015/0188117 A1 | * | 7/2015 | Kim | H01M 2/305 |
| | | | | 439/762 |

FOREIGN PATENT DOCUMENTS

| | | |
|---|---|---|
| DE | 202010016521 U1 | 3/2011 |
| DE | 202011000270 U1 | 3/2011 |
| DE | 202011000271 U1 | 3/2011 |
| EP | 0825681 A1 | 2/1998 |
| EP | 2388862 A1 | 11/2011 |
| WO | WO-2010044111 A1 | 4/2010 |
| WO | WO-2013046175 A1 | 4/2013 |

OTHER PUBLICATIONS

Notification of Transmittal of International Preliminary Report on Patentability from International Bureau with Written Opinion of the International Searching Authority mailed on May 4, 2016 regarding Application No. PCT/EP2014/071741 (with English translation) (17 pages).

\* cited by examiner

BATTERY TERMINAL

CROSS-REFERENCE TO RELATED APPLICATIONS

This application is a 371 National Stage of International Application No. PCT/EP2014/071741 filed on Oct. 10, 2014, and published in German as WO 2015/055525 A1 on Apr. 23, 2015. This application claims the priority to German Application No. 20 2013 104 621.3, filed on Oct. 14, 2013. The entire disclosures of the above applications are hereby incorporated by reference.

BACKGROUND

This section provides background information related to the present disclosure which is not necessarily prior art.

FIELD

The disclosure relates to a battery terminal having a pole contact element which is designed to surround a pole of a rechargeable battery on a mounting plane, a first and a second limb which are each connected to the pole contact element, the spacing between the first and second limbs being reducible by application of force in order to fasten the pole contact element to the pole, and a tensioning arrangement which couples the two limbs to one another, said tensioning arrangement having a tensioning screw which can be actuated so as to apply force to the two limbs and which is oriented along a tensioning direction which is tilted with respect to the mounting plane.

Battery terminals of the above-mentioned type are, for example, used in motor-vehicle engines in order to be connected to a starter battery. For this, such a starter battery formed by a rechargeable battery has a positive pole and a negative pole, to each of which a pole contact element of the battery terminal is connectable.

Usually, the pole of the rechargeable battery has the shape of a cylinder or truncated cone. The cylinder or cone axis of the pole is then perpendicular to a plane in which the pole contact element is arranged when it encircles the pole. In the following, this plane is referred to as mounting plane.

From document DE 20 2011 000 271 U1, a battery terminal having a pole contact element is known, which comprises two limbs which can be pulled together by means of a tensioning screw, by means of which limbs the pole contact element firmly encircles the pole of the rechargeable battery. In order to facilitate the mounting of the pole contact element on the pole, the limbs together with the tensioning screw are tilted with respect to the mounting plane.

This arrangement has the disadvantage that the angle of tilt has to be adapted to the individual requirements of the mounting site to make an easier mounting possible. This is relatively complex since the manufacturing of the parts of the battery terminal which are firmly connected to each other has to be adapted accordingly.

SUMMARY

This section provides a general summary of the disclosure, and is not a comprehensive disclosure of its full scope or all of its features.

It is an object of the disclosure to provide a battery terminal which can be adapted to the individual conditions of the mounting site with an effort as low as possible.

The tensioning arrangement specified in the battery terminal according to the disclosure comprises a first clamping piece which can be positioned on the first limb and a second clamping piece which can be positioned on the second limb, wherein the tensioning screw is passed through a first screw receptacle formed in the first clamping piece and a second screw receptacle formed in the second clamping piece, said first and second screw receptacles being aligned with one another along the tensioning direction. The tensioning screw defines the distance of the clamping pieces to each other. This distance in turn defines the application of force on the two limbs. The smaller the distance, the higher the tensioning force which is applied to the two limbs. By means of the limbs the pole contact element is clamped to the pole. Due to the fact that the tensioning direction defined by the longitudinal axis of the tensioning screw lies outside the mounting plane, an easier mounting is possible. In particular, the tensioning screw can be tightened more easily. The tensioning direction can be adapted in a particularly advantageous manner to varying structural conditions of the mounting site by a corresponding orientation of the screw receptacles formed in the two clamping pieces.

A further advantage of the arrangement according to the disclosure is that the limbs are stabilized by the clamping pieces. As a result thereof, material on the pole contact element and the limbs can be saved.

In an advantageous embodiment, a first clamping contact surface of the first clamping piece is in operative connection with a surface of the first limb facing away from the second limb, whereas a second clamping contact surface of the second clamping piece is in operative connection with a surface of the second limb facing away from the first limb. The first and the second limb are thus arranged between the clamping pieces, which cause an application of force on the limbs. This enables a simple structure of the tensioning arrangement without additional force transmission elements.

Further, it is advantageous when at least one of the two clamping pieces has a lateral surface which is orthogonal to the tensioning screw and via which a force can be applied to the clamping piece by means of a screw head of the tensioning screw. Thus, a uniform application of force on the clamping piece is possible.

Further, it is advantageous when in at least one of the two clamping pieces a thread is formed into which the tensioning screw can be screwed. By means of such a thread engagement the desired application of force on the limbs can be particularly easily and precisely.

In an alternative embodiment, also the other clamping piece has a lateral surface which is orthogonal to the tensioning screw and against which a nut bears which is in thread engagement with the tensioning screw for the application of force on the two limbs. Thus, it is possible to use a suitable combination of tensioning screw and nut, largely independent of the specific design of the two clamping pieces.

Preferably, the first and/or the second clamping piece are substantially trapezoidal in cross-section. As a result, a particularly simple structure is possible.

A further advantage exists when the first and/or the second limb has a support element pointing in the direction of the other limb at an end portion facing away from the pole contact, by means of which support element the limbs support each other at least when the battery terminal is mounted on the pole. By means of the support element a firm connection between the pole contact element and the pole is guaranteed so that a permanent safe clamping is achieved and corrosion is prevented. Thus, the electric contact between the pole contact element and the pole is guaranteed.

In a further preferred embodiment, the support element is formed by a limb portion which is bent towards the other limb. In this way, the support element can be realized particularly easily.

By means of the support element, preferably a minimum distance between the two limbs is defined so that by rotation of the tensioning screw the distance between the limbs can be adjusted in a range, the lower limit of which is predetermined by this minimum distance. This minimum distance is in particular defined such that in the case of the minimum distance the clamping connection formed between the pole contact element and the pole is designed firmly and permanently and under normal operating conditions an unintended disconnection of the battery terminal from the pole is ruled out.

In a particularly preferred embodiment of the disclosure, at least one, preferably more beads are formed in a transition portion between the first limb and the pole contact element and/or in a transition portion between the second limb and the pole contact element each time. By means of these beads, the stiffness of the battery terminal, in particular in the transition portion, is increased so that a twisting and/or bending of the battery terminal is prevented or made more difficult and thus the firm connection between the battery terminal and the pole is guaranteed. Further, it is thus achieved that the tensioning force generated by the tensioning screw is uniformly transmitted from the limbs onto the pole contact element so that it safely encircles the pole and thus clamps it reliably.

Further, it is advantageous when at least an embossing, at least a recess and/or at least a projection is provided in the inside surface of the pole contact element provided for the contact with the pole, by means of which a firm seat of the pole contact element on the pole is guaranteed. The embossing, recess and/or projection are in particular formed such that they increase the friction and adhesive force between the pole contact element and the pole so that a disconnection of the clamping connection is made more difficult.

In a further advantageous embodiment it is provided that the pole contact element is formed substantially cylindrically or frusto-conically, that the surfaces of the limbs facing each other are substantially parallel to each other, and that the center axis of the pole contact element lies perpendicular to the mounting plane. By means of the cylindrical or frusto-conical structure it is guaranteed that poles of rechargeable batteries which are typically cylindrical or frusto-conical are encircled in a best possible way.

Further, it is particularly advantageous when the first limb, the pole contact element, the second limb and the connecting contact element are formed in one piece. As a result, it is achieved that there are no joints, and thus the strength and the stiffness of the battery terminal are increased. Further, in this way a simple and cost-efficient manufacturing is achieved.

DRAWINGS

The drawings described herein are for illustrative purposes only of selected embodiments and not all possible implementations, and are not intended to limit the scope of the present disclosure.

Further features and advantages of the disclosure result from the following description which explains the disclosure in more detail on the basis of embodiments in connection with the enclosed Figures.

Figure 2:
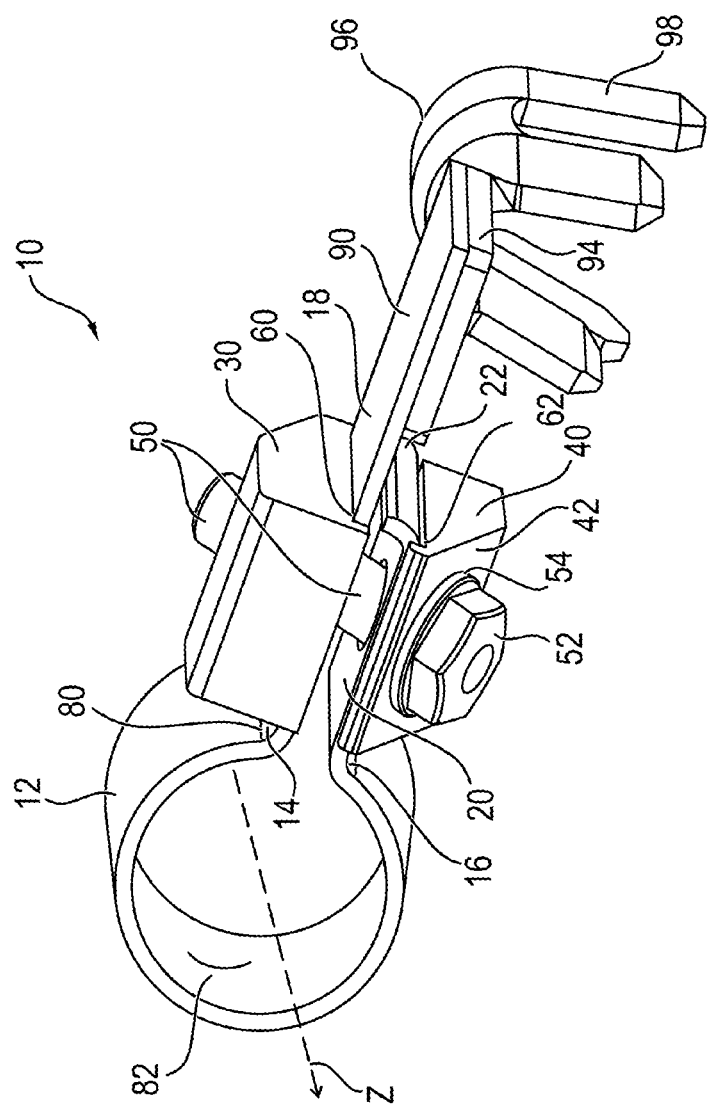

FIG. 1 shows a schematic illustration of a battery terminal according to a first embodiment of the disclosure, and FIG. 2 shows a schematic illustration of a battery terminal according to a second embodiment of the disclosure.

DETAILED DESCRIPTION

Example embodiments will now be described more fully with reference to the accompanying drawings.

In FIG. 1, a schematic illustration of a battery terminal 10 according to a first embodiment of the disclosure is shown. The battery terminal 10 comprises a substantially cylindrical pole contact element 12 which, when the battery terminal 10 is mounted on a starter battery of a vehicle, encircles a pole of this starter battery, which is not illustrated in FIG. 1, and is electrically connected thereto. Further, the battery terminal 10 has two limbs 18, 20 connected to the pole contact element 12 at transition portions 14, 16, wherein these limbs 18, 20 each have a bore through which a tensioning screw 50 is passed. In FIG. 1, only the bore formed in the limb 20 is shown and is identified with the reference sign 21 thereat.

The battery terminal 10 further has a first clamping piece 30 bearing against the first limb 18 and a second clamping piece 40 bearing against the second limb 20. The clamping pieces 30, 40 each have a recess 60 and 62, respectively, into which the associated limb 18, 20 is press-fit. The surface of the first limb 18 which comes to rest against the basic surface of the first clamping piece 30, forms a first clamping contact surface. Accordingly, the surface of the second limb 20 which comes to rest against the basic surface of the second clamping piece 40 forms a second clamping contact surface. The clamping pieces 30, 40 can thus be placed against the limbs 18, 20 from one side, without sliding along the surfaces of the limbs 18, 20 in the direction of the cylinder axis of the pole contact element 12 identified with Z in FIG. 1.

In the first clamping piece 30, a first screw receptacle is formed and in the second clamping piece 40 a second screw receptacle is formed, wherein these two screw receptacles being invisible in the illustration according to FIG. 1. The two screw receptacles and the two bores 21 formed in the limbs 18, 20 are aligned with one another for the passage of the tensioning screw 50. As already indicated above, the two recesses 60, 62 facilitate the alignment of the screw receptacles formed in the clamping pieces 30, 40 and the bores 21 formed in the limbs 18, 20.

The clamping pieces 30, 40 are each almost trapezoidal in cross-section. The screw receptacle present in the first clamping piece 30 is designed such that its longitudinal axis is tilted with respect to the mounting plane. By mounting plane a plane is meant in the present application, which is spanned by the cylindrical pole contact element 12. The mounting plane thus lies perpendicular to the cylinder axis Z of the pole contact element 12. Also the screw receptacle formed in the second clamping piece 40 is oriented such that its longitudinal axis is tilted with respect to the mounting plane.

The tensioning screw 50 has a hexagon screw head 52 which is arranged on an inclined surface 42 of the second clamping piece 40. A washer 54 is provided between the screw head 52 and the inclined surface 42.

In the screw receptacle of the first clamping piece 30, a thread invisible in FIG. 1 is formed into which the tensioning screw 50 is screwed. The position-correct screwing of the tensioning screw 50 is facilitated by the recesses 60, 62 of the clamping pieces 30, 40 in which the limbs 18, 20 rest and are thus fixed from one side along the cylinder axis Z.

In particular, a twisting of the clamping pieces 30, 40 is thus largely ruled out when the tensioning screw 50 is screwed into the thread.

By tightening the tensioning screw 50, the distance between the limbs 18, 20 can be varied and thus the pole contact element 12 can be tightened on the pole of the starter battery. Here, the distance between the limbs 18, 20 is dimensioned such that the pole contact element 12 can be placed on the pole and loosely surrounds it. Thereafter, the tensioning screw 50 is screwed into the thread provided in the clamping piece 30, as a result whereof the two clamping pieces 30, 40 and, together therewith, the two limbs 18, 20 are brought closer to each other. The mutual distance of the two limbs is reduced until a support element 22 formed on the second limb 20 and facing the first limb 18 comes into contact with the first limb. Thus, it is achieved that a clamping connection between the pole and the pole contact element 12 is established which prevents a disconnection of the electrical connection of the pole contact element 12 and thus a disconnection of the electrical connection between the battery terminal 10 and the pole.

The first limb 18 has a connecting contact element 90 on which a contact surface 94 is mounted which in turn is connected to a connecting line 92. The mounting of the contact surface 94 on the connecting contact element 90 can be realized by welding or soldering. In the inside surface of the pole contact element 12 facing the pole an embossing 82 is provided. This improves the electric contact with the pole of the rechargeable battery. This is achieved by a locally increased contact pressure which locally largely prevents corrosion of the embossing. The limbs 18, 20 have one or more beads 80 in the transition portions 14, 16 which increase the stiffness of the battery terminal 10 in the transition portions 14, 16.

In FIG. 2, a schematic illustration of a battery terminal 10 according to a second embodiment of the disclosure is shown. Elements having the same structure or the same function are identified with the same reference signs.

In the second embodiment, in the area of the connecting contact element 90 the contact surface 94 of a crimp contact 96 is welded thereon or soldered thereto, via which crimp contact in turn an electric contact with the connecting line 92 can be established. For this, one conductor or more conductors of the connecting line 92 are arranged between fingers 98 of the crimp contact 96. Thereafter, the fingers 98 are moved toward each other and a crimp connection is formed between the crimp contact 96 and the connecting line 92.

It goes without saying that the above-described embodiments are merely illustrative. Various modifications are conceivable. For example, instead of the thread formed in the first clamping part a nut can be used which is screwed onto the end of the tensioning screw 50 facing away from the screw head 52 to tighten the pole contact element 12 on the pole of the rechargeable battery.

The foregoing description of the embodiments has been provided for the purposes of illustration and description. It is not intended to be exhaustive or to limit the disclosure. Individual elements or features of a particular embodiment are generally not limited to that particular embodiment, but where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A battery terminal, comprising
a pole contact element which is designed to surround a pole of a rechargeable battery on a mounting plane;
a first limb and a second limb which are each connected to the pole contact element, the spacing between the first and second limbs being reducible by application of force in order to fasten the pole contact element to the pole;
and a tensioning arrangement which couples the two limbs to one another, and having a tensioning screw which can be actuated so as to apply force to the two limbs, and which is oriented along a tensioning direction which is tilted with respect to the mounting plane,
wherein the tensioning arrangement comprises a first clamping piece which can be positioned on the first limb and a second clamping piece which can be positioned on the second limb, wherein the tensioning screw is passed through a first screw receptacle formed in the first clamping piece and a second screw receptacle formed in the second clamping piece, said first and second screw receptacles being aligned with one another along the tensioning direction; and
wherein the first and/or the second limb has a support element pointing in the direction of the other limb at an end portion facing away from the pole contact, by means of which support element the limbs support each other at least when the battery terminal is mounted on the pole; and
wherein the support element is formed by a limb portion which is bent towards the other limb.

2. The battery terminal according to claim 1, wherein a first clamping contact surface of the first clamping piece is in operative connection with a surface of the first limb facing away from the second limb, and a second clamping contact surface of the second clamping piece is in operative connection with a surface of the second limb facing away from the first limb.

3. The battery terminal according to claim 1, wherein the first and/or the second clamping piece are substantially trapezoidal in cross-section.

4. The battery terminal according to claim 1, wherein by means of the support element, a minimum distance between the limbs is defined such that in the case of this minimum distance the pole of the rechargeable battery is safely clamped by the pole contact element.

5. The battery terminal according to claim 1, wherein a transition portion between the first limb and the pole contact element and/or in a transition portion between the second limb and the pole contact element each time at least one bead is formed.

6. The battery terminal according to claim 1, wherein a surface of the pole contact element provided for the contact with the pole, at least an embossing, at least a recess and/or at least a projection is provided.

7. The battery terminal according to claim 1, wherein the pole contact element is formed substantially cylindrically or frusto-conically, that the surfaces of the limbs facing each other are substantially parallel to each other, and that the surfaces of the limbs facing each other lie perpendicular to the mounting plane.

8. The battery terminal according to claim 1, wherein the first limb, the pole contact element, the second limb and a connecting contact element formed on one of the two limbs are formed in one piece.

9. The battery terminal according to claim 1, wherein by means of the support element, a minimum distance between the limbs is defined such that in the case of this minimum distance the pole of the rechargeable battery is safely clamped by the pole contact element.

10. The battery terminal according to claim 1, wherein at least one of the two clamping pieces has a lateral surface which is perpendicular to the tensioning screw and via which a force can be applied to the clamping piece by means of a screw head of the tensioning screw.

11. The battery terminal according to claim 10, wherein at least one of the two clamping pieces a thread is formed into which the tensioning screw can be screwed.

12. The battery terminal according to claim 10, wherein also the other clamping piece has a lateral surface which is perpendicular to the tensioning screw and against which a nut bears which is in thread engagement with the tensioning screw for applying a force to the two limbs.

* * * * *